United States Patent [19]
Jackson, Jr. et al.

[11] 4,079,047
[45] Mar. 14, 1978

[54] POLYESTERS CONTAINING A CRITICAL RANGE OF SUBERIC ACID

[75] Inventors: Winston Jerome Jackson, Jr., Kingsport, Tenn.; William Ronald Darnell, Weber City, Va.

[73] Assignee: Eastman Kodak Company, Rochester, N.Y.

[21] Appl. No.: 739,369

[22] Filed: Nov. 5, 1976

[51] Int. Cl.² .......................................... C08G 63/12
[52] U.S. Cl. ................................................ 260/75 R
[58] Field of Search ........................ 260/75 R, 47 C

[56] References Cited

U.S. PATENT DOCUMENTS

| | | | |
|---|---|---|---|
| 2,901,466 | 8/1959 | Kibler et al. | 260/75 N |
| 3,067,178 | 12/1962 | Greenberg et al. | 260/75 R |
| 3,143,526 | 8/1964 | Caldwell et al. | 260/75 R |
| 3,515,628 | 6/1970 | Jackson et al. | 260/75 R |

*Primary Examiner*—Lucille M. Phynes
*Attorney, Agent, or Firm*—Charles R. Martin; Daniel B. Reece, III

[57] ABSTRACT

Disclosed are polyesters composed of terephthalic acid, suberic acid and 1,4-cyclohexanedimethanol, wherein the suberic acid is within a critical range of 60 to 90 mole percent. These polyesters exhibit desirable adhesive properties.

2 Claims, 1 Drawing Figure

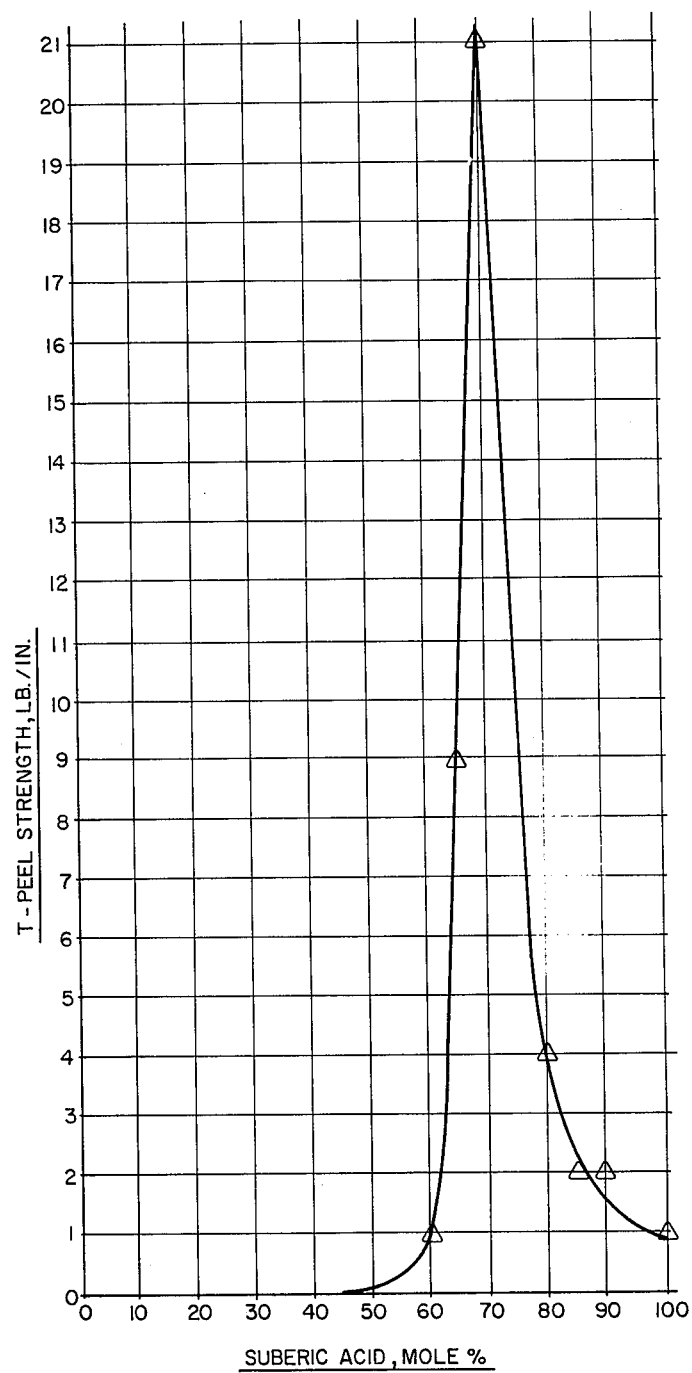

POLYESTERS CONTAINING A CRITICAL RANGE OF SUBERIC ACID

This invention relates to polyesters containing a critical range of 60 to 90 mole percent suberic acid. These polyesters are useful as hot melt adhesives for unheated metals.

Polyester hot melt adhesives are well known in the art. While many polyester hot melt adhesives are well suited for bonding heated metals to other heated metals, polyester hot melt adhesives have not received wide acceptance for bonding unheated metals to unheated metals because of generally poor performance.

We have now discovered a polyester that performs well when used as a hot melt adhesive to bond unheated metals to unheated metals. The polyesters of this invention can be described as consisting essentially of
(A) a dicarboxylic acid component which is
  (1) from 60 to 90 mole percent suberic acid, and
  (2) from 40 to 10 mole percent terephthalic acid, and
(B) 1,4-cyclohexanedimethanol.

In a preferred embodiment of the invention the dicarboxylic acid component is 65 to 80 mole percent suberic acid and 35 to 20 mole percent terephthalic acid.

The polyesters of this invention can be prepared by methods for preparing high molecular weight polyesters well known in the art, such as direct condensation or ester interchange. Preferably the polyesters are prepared by ester interchange where the dialkyl ester of terephthalic acid and suberic acid, such as dimethyl terephthalate and dimethyl suberate, are reacted with the 1,4-cyclohexanedimethanol to form a mixture of the glycol esters of terephthalic acid and suberic acid and then the mixture of esters is polycondensed at high temperature and low pressure to form a high molecular weight polymer.

The polyesters of this invention have an inherent viscosity of at least 0.4, and preferably at least 0.6, measured at 25° C. using 0.50 grams of polymer per 100 ml. of a solvent composed of 60 volumes of phenol and 40 volumes tetrachloroethane.

The prior art applicants are aware of this U.S. Pat. No. 3,515,628 and U.S. Pat. No. 2,901,466.

U.S. Pat. No. 3,515,628 discloses hot melt adhesives for use on heated metals. In Example 26, a polyester of 50 mole percent terephthalic acid, 50 mole sebacic acid and 1,4-cyclohexanedimethanol is disclosed.

U.S. Pat. No. 2,901,466 discloses polyesters of terephthalic acid, 1,4-cyclohexanedimethanol and other bifunctional dicarboxylic acids. Several other bifunctional dicarboxylic acids are disclosed in column 6, lines 58–59 and including adipic, sebacic, azelaic, α-ethylsuberic and α,α-diethyladipic acid.

The polyesters of this invention are thought to be novel over the disclosure of these patents for two reasons. First, the suberic acid used in the polyester of this invention is not disclosed. Second, the specific range of 60 to 90 mole percent suberic acid used in the polyester of this invention is not disclosed.

The polyesters of this invention are thought to be unobvious over the disclosure of these patents because the adhesion to unheated metals of the polyesters of this invention is unobvious over the adhesion to unheated metals of similar polyesters prepared from terephthalic acid, 1,4-cyclohexanedimethanol and an amount of suberic acid that is below 60 mole percent or above 90 mole percent. Thus, the unobvious adhesion of the polyesters of this invention result from the combination of a critical range of the suberic acid as distinguished from use of an amount of suberic acid either above or below the critical range.

The unobvious adhesion properties of the polyesters of this invention can be fully appreciated by considering the attached FIGURE.

In the FIGURE, the horizontal scale represents the amount of suberic acid in the polyester, expressed in mole percent. The vertical scale represents the adhesion properties of the polyester to unheated metal, measured in T-peel strength, which is expressed in pounds per inch. Presented in the FIGURE is a curve correlating the relationship between th mole percent of suberic acid in the polyester and the adhesion of the polyester to unheated metal.

The data used to prepare the curve in the FIGURE are obtained by preparing polyesters containing 60, 65, 70, 80, 85, 90 and 100 mole percent suberic acid in accordance with the method of Example 59 of U.S. Pat. No. 2,901,466, except that the cis/trans ratio of the 1,4-cyclohexanedimethanol was 30/70. The T-peel strength of each of the polyesters is than determined. The adhesive bonds are prepared by first washing 6-mil, tin-free, precut 1-in. wide steel specimens three times in detergent and rinsing in water each time. Then the metal specimens are rinsed in acetone and allowed to dry in air. Next, the adhesive bond is prepared between the unheated 1 × 4-in. metal specimens by first attaching the specimens with small pieces of double-adhesive tape to the metal upper and lower jaws of a Hot-Melt Adhesive Tester, Model 80-22, from Testing Machines, Inc., of Amityville, N.Y. The movable lower jaw of the tester, with its attached metal specimen, is moved to the side, and the hot-melt adhesive to be tested is applied to a 1-in. length of the metal specimen during about 5 seconds, using a Nordson Model AD-25 Hot-Melt Adhesive Handgun maintained at 275° C. The lower jaw is then positioned under the upper jaw of the tester such that the upper metal specimen will be exactly superimposed upon the lower metal specimen when the upper and lower jaws are brought together. After a predetermind "open time" of 1 min., the jaws of the tester are closed for 10 sec. under a force of 100–110 lb. to form the T-peel adhesive bond. The T-peel strength values of the adhesive bonds are determined in accordance with ASTM D1876. The values of T-peel stength for each of the polyesters is then plotted on the FIGURE and the curve is prepared.

As will be appreciated from a consideration of the curve in the FIGURE, if less than 60 mole percent suberic acid is used, the T-peel strength is less than about 1 lb./in. As will also be observed, if more than about 90 mole percent suberic acid is used, the T-peel strength is less than 2 lb./in. In contrast, if the amount of suberic acid is from 60 to 90 mole percent the T-peel strength is unobviously high. For example, in the preferred range of 65 to 80 mole percent suberic acid, the T-peel strength is a minimum of about 4 lb./in. and achieves a maximum value of 21 lb./in. at 70 mole percent suberic acid.

The polyesters of this invention have been described as "consisting essentially of" the dicarboxylic acid and diol component. By the term "consisting essentially of" we mean that these polyesters can contain other materials as long as the unobvious adhesion properties are retained. For example, other dicarboxylic acids and diols could be used, even in major amounts, if the resulting polyester retains the unobvious adhesion properties of the polyester of the invention. Also, conventional additives for adhesives, such as antioxidants, stabilizers, pigments and the like can be incorporated into the polyester of this invention as long as the polyester retains unobvious adhesion properties. In one aspect of this invention, the adhesion of the polyesters of this invention can be enhanced by physically blending the polyesters with up to about 20 weight percent of a carboxylated polyester such as those described in U.S. Pat. No. 3,459,584, and 3,652,502. The carboxylated polyesters useful for blending with the polyesters of this invention have acid numbers of about 10–200, preferably 40–80. The carboxylated polyesters may be blended with the polyesters of this invention by various well known procedures, including mechanical mixing of the particulate polymers, blending on hot rolls, and mixing in solution and then removing the solvent. The preferred methods are to blend the two polymers in powder of granular form and extrude with a screw-type extruder.

Examples of metals which may be bonded using the polyesters of this invention without preheating include steel, iron, aluminum, chromium, copper, brass, bronze, nickel, zinc, titanium, and tin.

The polyesters of this invention can be used as a hot melt adhesive using apparatus and techniques well known in the art.

We claim:

1. A polyester having an inherent viscosity of at least 0.4 measured at 25° C. using 0.50 grams of polymer per 100 ml. of a solvent composed of 60 volumes of phenol and 40 volumes of tetrachloroethane consisting essentially of
   (A) a dicarboxylic acid component which is
      (1) from 60 to 90 mole percent suberic acid, and
      (2) from 40 to 10 mole percent terephthalic acid, and
   (B) 1,4-cyclohexanedimethanol.

2. The polyester of claim 1 wherein the dicarboxylic acid component is 65 to 80 mole percent suberic acid and 35 to 20 mole percent terephthalic acid.

* * * * *